(12) United States Patent
Tallal et al.

(10) Patent No.: US 9,898,140 B2
(45) Date of Patent: Feb. 20, 2018

(54) USER INTERFACE DEVICE HAVING TRANSPARENT ELECTRODES

(71) Applicants:Commissariat á l'Energie Atomique et aux Energies Alternatives, Paris (FR); ISORG, Grenoble (FR)

(72) Inventors: Jamal Tallal, Grenoble (FR); Mohammed Benwadih, Champigny-sur-Marne (FR)

(73) Assignees: COMMISSARIAT À L'ÉNERGIE ATOMIQUE ET AUX ÉNERGIES ALTERNATIVES, Paris (FR); ISORG, Grenoble (FR)

( * ) Notice: Subject to any disclaimer, the term of this patent is extended or adjusted under 35 U.S.C. 154(b) by 427 days.

(21) Appl. No.: 14/391,986

(22) PCT Filed: Apr. 10, 2013

(86) PCT No.: PCT/FR2013/050777
§ 371 (c)(1),
(2) Date: Oct. 10, 2014

(87) PCT Pub. No.: WO2013/153327
PCT Pub. Date: Oct. 17, 2013

(65) Prior Publication Data
US 2015/0062461 A1  Mar. 5, 2015

(30) Foreign Application Priority Data
Apr. 11, 2012 (FR) ...................................... 12 53329

(51) Int. Cl.
*G06F 3/042* (2006.01)

(52) U.S. Cl.
CPC .... *G06F 3/042* (2013.01); *G06F 2203/04105* (2013.01)

(58) Field of Classification Search
CPC ......... G02F 1/133707; G02F 1/134309; G06F 2203/04105; G06F 3/042
See application file for complete search history.

(56) References Cited

U.S. PATENT DOCUMENTS 5,051,570 A * 9/1991 Tsujikawa ......... G02F 1/136277
250/201.1
8,354,666 B2  1/2013 Lee et al.
(Continued)

FOREIGN PATENT DOCUMENTS

JP    H01150192 A    6/1989
JP    2007183706 A   7/2007
(Continued)

OTHER PUBLICATIONS

"International Search Report: PCT/FR2013/050777", dated Jul. 12, 2013, Publisher: PCT ISA, EPO, Published in: FR.
(Continued)

*Primary Examiner* — Abbas Abdulselam
(74) *Attorney, Agent, or Firm* — Kaplan Breyer Schwarz, LLP (57) ABSTRACT

The invention relates to an interface device including an array of pixels and an insulating, transparent substrate, the pixels being connected to the substrate by linking elements, the contact surface between the linking elements and the pixels being strictly smaller than the surface of the pixels facing the substrate.

18 Claims, 5 Drawing Sheets

(56) References Cited

U.S. PATENT DOCUMENTS

| | | | | |
|---|---|---|---|---|
| 2002/0063813 | A1* | 5/2002 | Dirscherl | G02F 1/133617 349/61 |
| 2002/0093027 | A1* | 7/2002 | Zhong | G02F 1/136213 257/98 |
| 2003/0052847 | A1* | 3/2003 | Okishiro | G02F 1/134363 345/87 |
| 2003/0086030 | A1 | 5/2003 | Taniguchi et al. | |
| 2004/0114061 | A1* | 6/2004 | Kimura | H01L 21/67011 349/45 |
| 2005/0280637 | A1 | 12/2005 | Ikeda et al. | |
| 2006/0145365 | A1 | 7/2006 | Halls et al. | |
| 2007/0287394 | A1 | 12/2007 | Swan et al. | |
| 2008/0068484 | A1 | 3/2008 | Nam | |
| 2008/0122798 | A1 | 5/2008 | Koshiyama et al. | |
| 2008/0150848 | A1 | 6/2008 | Chung et al. | |
| 2008/0231926 | A1 | 9/2008 | Klug et al. | |
| 2008/0297487 | A1 | 12/2008 | Hotelling et al. | |
| 2009/0027371 | A1 | 1/2009 | Lin et al. | |
| 2009/0123029 | A1 | 5/2009 | Harada et al. | |
| 2009/0237372 | A1 | 9/2009 | Kim et al. | |
| 2009/0267919 | A1 | 10/2009 | Chao et al. | |
| 2009/0273580 | A1 | 11/2009 | Ota et al. | |
| 2010/0007839 | A1* | 1/2010 | Jun | G02F 1/133707 349/141 |
| 2010/0013793 | A1 | 1/2010 | Abileah et al. | |
| 2010/0027295 | A1 | 2/2010 | Lee | |
| 2010/0067235 | A1 | 3/2010 | Yamashita et al. | |
| 2010/0103139 | A1 | 4/2010 | Soo et al. | |
| 2010/0283763 | A1 | 11/2010 | Kim et al. | |
| 2010/0294936 | A1 | 11/2010 | Boberl et al. | |
| 2010/0295821 | A1 | 11/2010 | Chang et al. | |
| 2010/0315413 | A1 | 12/2010 | Izadi et al. | |
| 2011/0043473 | A1 | 2/2011 | Kozuma | |
| 2011/0043486 | A1 | 2/2011 | Hagiwara et al. | |
| 2011/0175830 | A1 | 7/2011 | Miyazawa et al. | |
| 2011/0222011 | A1 | 9/2011 | Murai et al. | |
| 2011/0316679 | A1 | 12/2011 | Pihlaja | |
| 2012/0162558 | A1* | 6/2012 | Chung | G02F 1/134363 349/42 |
| 2012/0182261 | A1* | 7/2012 | Wang | G06F 3/044 345/174 |
| 2013/0076695 | A1 | 3/2013 | Gomez et al. | |
| 2014/0306097 | A1 | 10/2014 | Gomez et al. | |
| 2014/0362051 | A1 | 12/2014 | Gomez et al. | |
| 2015/0220211 | A1 | 8/2015 | Gras et al. | |
| 2015/0293661 | A1 | 10/2015 | Gomez | |

FOREIGN PATENT DOCUMENTS

| | | |
|---|---|---|
| JP | 2009271225 A | 11/2009 |
| JP | 2010015485 A | 1/2010 |
| JP | 2010055507 A | 3/2010 |
| JP | 2010182046 A | 8/2010 |
| JP | 2011070658 A | 4/2011 |
| JP | 2012098959 A | 5/2012 |
| JP | 2012524306 A | 10/2012 |
| WO | 2010058629 A1 | 5/2010 |
| WO | 2010135127 A1 | 11/2010 |
| WO | 2011119483 A1 | 9/2011 |
| WO | 2010122865 A1 | 10/2012 |

OTHER PUBLICATIONS

Simin Baharlou, translation of "International Preliminary Report on Patentability," dated Oct. 14, 2014 for corresponding International Application No. PCT/FR2013/050777, Publisher: WIPO.
Willem Den Boer, et al., "Active Matrix LCD with Integrated Optical Touch Screen", 2003, Publisher: SID 03 Digest.
Officer: J. Thibaudeau, "International Search Report," dated Feb. 4, 2014, issued in PCT International Application No. PCT/FR2013/052450, which is a counterpart of related U.S. Appl. No. 14/435,356.
Officer: J. Thibaudeau "Written Opinion of the International Searching Authority," dated Feb. 4, 2014, issued in PCT International Application No. PCT/FR2013/052450, which is a counterpart of related U.S. Appl. No. 14/435,356.
"Final Office Action", dated Sep. 30, 2015, issued in related U.S. Appl. No. 13/569,379.
"Non-final Office Action", dated Dec. 17, 2015, issued in related U.S. Appl. No. 14/347,986.
"Non-Final Office Action", dated Jul. 28, 2016, issued in related U.S. Appl. No. 14/427,551.
"Non-final Office Action", dated Nov. 5, 2015, issued in related U.S. Appl. No. 14/435,356.
"Notice of Allowance," dated Apr. 13, 2016, issued in related U.S. Appl. No. 14/347,986.
Officer: Llorens V. Charcos "Written Opinion of the International Searching Authority," dated Nov. 26, 2012, issued in PCT International Application No. PCT/FR2012/051863, which is a counterpart of U.S. Appl. No. 14/347,982.
Officer: Llorens V. Charcos "Written Opinion of the International Searching Authority," dated Nov. 26, 2012, issued in PCT International Application No. PCT/FR2012/051864, which is a counterpart of U.S. Appl. No. 14/347,986.
Officer: Jacques Durand "Written Opinion of the International Searching Authority," dated Jul. 12, 2013, issued in PCT International Application No. PCT/FR2013/050777, which is a counterpart of U.S. Appl. No. 14/391,986.
Officer: J. Legrand "International Search Report," dated Nov. 13, 2013, issued in PCT International Application No. PCT/FR2013/052090, which is a counterpart of U.S. Appl. No. 14/427,551.
Officer: J. Legrand, "Written Opinion of the International Searching Authority," dated Nov. 13, 2013, issued in PCT International Application No. PCT/FR2013/052090, which is a counterpart of U.S. Appl. No. 14/427,551.
"Non Final Office Action" dated Oct. 21, 2015, issued in related U.S. Appl. No. 14/347,982.
V. Charcos Llorens, "Search Report," dated Apr. 27, 2012, issued in French Application No. 11/58611, which is a counterpart of related U.S. Appl. No. 13/569,379.
Jean-Yves Laurent et al, "CEA-LITEN S2S printing platform for Organic CMOS and Sensors Devices", "Proceedings LOPE-C Conference 2011", Jun. 2011, Publisher: CEA-Liten Institute, Published in: Frankfurt.
"Non Final Office Action", dated Feb. 27, 2014, issued in related U.S. Appl. No. 13/569,379.
Officer: V. Charcos Llorens, "International Search Report", dated Nov. 26, 2012, issued in related PCT International Patent Application No. PCT/FR2012/051864, which is a counterpart of related U.S. Appl. No. 14/347,986.
Hoffner, Linh Nguyen, "Final Office Action," dated Sep. 10, 2014, issued in related U.S. Appl. No. 13/569,379.
"Non-final Office Action," dated Apr. 3, 2015, issued in related U.S. Appl. No. 13/569,379.
Linh Nguyen Hoffner, "Advisory Action," dated Dec. 24, 2014, issued in related U.S. Appl. No. 13/569,379.
Jamet, Laurent: "The Next Big Wave in the Electronics Industry," OnBoard Technology Sep. 14, 2011—pp. 32-34 (XP002674899).
Pentier, Olivier: "Isorg rend les surfaces intelligentes," Le Dauphine Libere, Sep. 5, 2011 (XP02674900).
CEA-LITEN, Isorg: "L'electronique organique imprimee: pour une industrie electronique durable qui repond aux nouveaux besoins de societe," Dossiers Thematiques du SITELESC, No. Jun. 1, 2011, pp. 12-13 (XP002674907).
Jamet, Laurent: "Organic photodetectors & image sensors, highly innovative products for new markets and attractive business opportunities for printed electronics industry," Printed Electronics and Photovoltaics Europe 2011, Idtechex, UK Apr. 6, 2011, pp. 1-17 (XP008151359).
Coutance, Pascal: "L'avenir appartient a l'electronique imprimee," Jan. 28, 2012 (XP002674911).
AEPI, "Agence d'Etude et de Promotion de l'Isere: 'ISORG a presente lors du Forum 4l une tablette interactive' (XP002674961)", "AEPI", Jun. 19, 2011, Publisher: URL: http://www.isorg.fr/rep- (56) References Cited

OTHER PUBLICATIONS edito/ido-6l/isorg_a_prb_sentb_lors_du_forum_4i_une_tablette_interactive.htm, Published in: FR.

Christophe Premont, "Photo detectors and sensors designed to be flexible (XP002674972)", "Electronic Engineering Times Europe", Sep. 14, 2011, pp. 17-18, Publisher: URL:http://www.isorg.fr/edito/files/photodectors_and_sensors_designed_to_be_flexible_798566.pdf, Published in: FR.

Marie Freebody, "New Materials Build Better Organic Photodetectors (XP002674974)", Aug. 9, 2011, pp. 1-3, Publisher: URL:http://www.isorg.fr/edito/files/new_materials_build_better_organic_photodetectors_174887.pdf, Published in: FR.

Laurent Marchandiau, "Isorg pane sur l'electronique organique imprimee, (XP002674975)", "Interview-Eco; L'essor", Sep. 12, 2011, Publisher: URL:http://www.lessor.fr/2011/09/12/interview-eco-isorg-parie-sur-1%E2%80%99electronique-organique-imprimee/, Published in: FR.

Officer: V. Charcos Llorens, "International Search Report," dated Nov. 26, 2012, issued in related PCT ntemational Patent Application No. PCT/FR2012/051863, which is a counterpart of U.S. Appl. No. 14/347,982.

"Final Office Action", dated Jun. 1, 2016, issued in related U.S. Appl. No. 4/435,356.

"Office Action" issued in Japanese patent application No. 2015-505003, dated Dec. 20, 2016.

"Final Office Action" issued in related U.S. Appl. No. 14/427,55, dated Dec. 9, 2016.

"Office Action" issued in related U.S. Appl. No. 14/738,356, dated Feb. 24, 2017.

"Japanese Office Action", Japanese Patent Application No. JP2015537328, dated Jun. 14, 2017, 4 pp.

\* cited by examiner

USER INTERFACE DEVICE HAVING TRANSPARENT ELECTRODES

BACKGROUND

The present invention relates to a user interface device, or man-machine interface, having transparent electrodes.

DISCUSSION OF THE RELATED ART

There are several examples of user interface or man-machine interface devices with transparent electrodes. For example, certain display screens, particularly liquid crystal displays and plasma displays, comprise transparent electrodes. Such is also the case of touch-sensitive displays which comprise a touch-sensitive surface, that is, a user interface device controllable by simple sliding of a finger or of a hand on a touch-sensitive surface, superimposed on a display screen.

Another example relates to a contactless user interface device such as described in French patent application FR1158607.

A user interface device having transparent electrodes generally comprises a pixel array. "Pixel" means a photo-active element, that is, an element capable, in particular, of emitting light, of modifying the light crossing it, and/or of detecting the light that it receives. As an example, the pixel may be a photon sensor. The selection of a pixel is performed by two electrodes which sandwich the pixel. The photons should be able to propagate freely between a user and the pixels. For this purpose, the electrodes connected to the pixels located between the pixels and the user are made of a transparent material. The transparent electrodes for example have the shape of strips connected to a plurality of pixels or of a single film connected to all the array pixels. The transparent electrodes are generally covered with an insulating and transparent coating, for example, plastic or glass.

The materials used to form transparent electrodes which are the most satisfactory in terms of properties of electric conductivity and transparency are transparent conductive oxides or TCOs, for example, indium tin oxide or ITO. To obtain a satisfactory electric conduction of the transparent electrodes, the thickness of the layers of the TCO material used should be greater than 50 nm. However, the layers of TCO material thus formed are brittle. Indeed, the forming of cracks in the electrodes can be observed when they are submitted to excessive stress. This may occur on manufacturing of the user interface device, which may in particular comprise thermal anneal steps which create stress in the layers of TCO material. This may also occur when the user interface device is desired to be deformed in operation, for example, when the user interface device is desired to be applied on a non-planar surface.

Attempts have been made to replace the TCO material with a more flexible material. A possibility corresponds to using a conductive polymer. However, the properties of electric conductivity of currently-available conductive polymers are generally not as good as those of TCO materials. Another possibility corresponds to using metals to form the electrodes. However, it is then necessary to deposit very thin metal layers, for example thinner than 10 nm for gold, to obtain transparent electrodes. The deposition methods are then complex. Another possibility comprises replacing the transparent electrodes with nanometer-range metal wires or of forming the transparent electrodes with carbon nanotubes. However, methods of manufacturing such electrodes are complex and/or cannot for the time being be implemented at a low cost.

More generally, the problems described hereabove for layers of TCO material may also be encountered as soon as the pixels comprise at least one layer of a brittle material.

There thus is a need for a user interface device comprising layers of a brittle material, particularly a user interface comprising transparent electrodes made of TCO, which do not crack on manufacturing of the user interface device or when the user interface device is deformed in operation.

SUMMARY

Thus, an object of the present invention is to provide a user interface device overcoming at least some of the disadvantages of existing devices.

Another object of the present invention is to provide a user interface device comprising at least one layer of a brittle material, particularly a user interface device having transparent electrodes made of TCO material.

Another object of the present invention is to provide a user interface device capable of being deformed in operation.

Another object of an embodiment of the present invention is to provide a user interface device capable of being actuated without any contact with the user.

Another object of an embodiment of the present invention is to provide a contactless user interface device capable of operating without emitting any radiation.

The present invention provides an interface device comprising a pixel array and a transparent insulating substrate, the pixels being connected to the substrate by connection elements, the contact surface area between the connection elements and the pixels being smaller than the surface area of the pixels opposite the substrate.

According to an embodiment of the invention, the contact surface area between the connection elements and the pixels is smaller than half the surface area of the electrodes opposite the substrate.

According to an embodiment of the invention, the connection elements are made of a material more flexible than the materials forming the pixels.

According to an embodiment of the invention, the connection elements are made of a flexible material having an elongation at break greater than or equal to 100.

According to an embodiment of the invention, the pixels comprise transparent conductive electrodes, the connection elements being connected to the electrodes, the contact surface area between the connection elements and the electrodes being smaller than the surface area of the electrodes opposite the substrate.

According to an embodiment of the invention, the electrodes are made of transparent conductive oxide.

According to an embodiment of the invention, the transparent conductive oxide is indium tin oxide or gallium zinc oxide.

According to an embodiment of the invention, the connection elements comprise at least a resist.

According to an embodiment of the invention, the connection elements further comprise at least an elastomer.

According to an embodiment of the invention, the connection elements are electrically conductive.

According to an embodiment of the invention, the pixels are organic photon sensors.

According to an embodiment of the invention, the device further comprises conductive elements on the substrate partly extending between the electrodes and the substrate, where the electrodes are not in contact with the conductive elements when the device is not deformed.

According to an embodiment of the invention, the conductive elements are metallic or made of conductive polymer.

The present invention also provides a method of manufacturing an interface device such as defined hereabove, comprising the steps of:

(a) covering the transparent insulating substrate with a resist layer;

(b) exposing the resist layer to a radiation to define the connection elements;

(c) forming the pixels on the resist layer; and (d) before or after step (c), partially removing the resist layer to form the connection elements.

According to an embodiment of the invention, step (c) comprises covering the resist layer with an electrically-conductive transparent layer and etching the electrically-conductive transparent layer to form the electrodes.

According to an embodiment of the invention, the electrically-conductive transparent layer is made of transparent conductive oxide.

According to an embodiment of the invention, the pixels are formed by successive deposition of additional layers on the electrically-conductive transparent layer and etching said additional layers.

According to an embodiment of the invention, the pixels are formed by printing techniques on the electrodes.

According to an embodiment of the invention, the method further comprises forming conductive elements on the substrate and covering the substrate and the conductive elements with the resist layer.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION

For clarity, the same elements have been designated with the same reference numerals in the various drawings and, further, the various drawings are not to scale. Further, only those elements which are useful to the understanding of the present invention have been shown and will be described. In particular, what use is made of the user interface devices described hereafter has not been detailed. It will be within the abilities of those skilled in the art to use the provided devices in any type of system capable of being controlled via a touch and/or contactless interface. Further, the means for processing the information provided by the user interface devices described hereafter and the means of connection with the system(s) to be controlled are within the abilities of those skilled in the art and will not be described.

Figure 1:
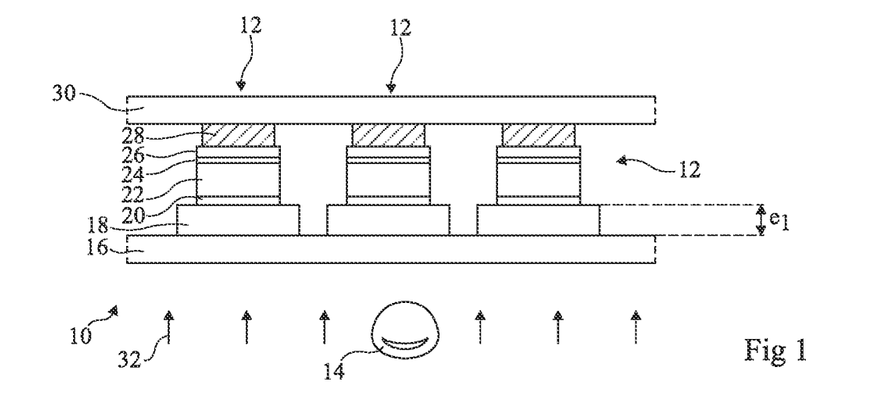
FIG. 1 is a partial simplified cross-section view of an example of a known user interface device having transparent electrodes.

FIG. 1 shows an example of a contactless user interface device such as described in French patent application FR1158607.

Device 10 comprises an array of photon sensors or photodetectors 12, preferably capable of detecting variations of the shadow or of the image of an actuating member, for example, a finger 14. Photodetectors 12 may be arranged in rows and in columns. Photodetectors 12 are formed on a substrate 16 made of a transparent or translucent dielectric, for example, glass or plastic.

Each photodetector 12 comprises a stack comprising, in the following order from substrate 16:

a transparent electrode 18 made of a TCO material;

an electron injection portion 20, for example, made of heavily-doped transparent organic semiconductor polymer or of a transparent conductive metal oxide, for example, of ZnO type;

a portion 22 made of a mixture of organic semiconductor polymers, for example poly(3-hexylthiophene) or poly(3-hexylthiophene-2,5-diyl) (P-type semiconductor), known as P3HT, mixed with [6,6]-phenyl-$C_{61}$-butyric acid methyl ester (N-type semiconductor), known as PCBM;

a portion 24 of heavily-doped organic semiconductor polymer (for example, a polymer known as PEDOT:PSS, which is a mixture of poly(3,4)-ethylenedioxythiophene and of sodium polystyrene sulfonate;

a conductive layer 26, for example, a conductive ink, particularly comprising metal particles embedded in a conductive polymer of silver ink type;

an electrode 28, for example, made of gold or silver.

A protective coating 30 covers the upper surface of the array (on the side of electrode 28).

Photoactive portions 22 of photodetectors 12 are here intended to be illuminated through substrate 16 and through electrodes 18 and portions 20. The light radiation is schematically shown by arrows 32.

Photodetector array 12 may be a passive array or an active array. For a passive array, transparent electrodes 18 may correspond to parallel rectilinear strips, and each strip may be connected to all the photodetectors 12 of a same row. For an active array, transparent electrodes 18 may correspond to a continuous layer in contact with all the photodetectors 12 of the array. As a variation, transparent electrodes 18 may be isolated from one another, photodetectors 12 being in this case independent from one another.

To provide a satisfactory conduction of transparent electrodes 18, thickness $e_1$ of electrodes 18 of TCO material is greater than 50 nm.

The TCO materials used to form transparent electrodes 18 are brittle materials. When they are submitted to excessive stress, such materials may lose their properties, particularly in terms of conduction. Indeed, beyond a given stress value, cracks appear in the TCO material, which cracks cause a decrease in the electric conductivity of electrodes 18. There exist several techniques to mechanically characterize such materials, particularly the use of test bars for traction or compression tests, to determine characteristic physical values such as the Young's modulus, Poisson's ratio, or the elongation at break. For TCO materials, the elongation at break is generally small, for example, no more than 10%.

Figure 2:
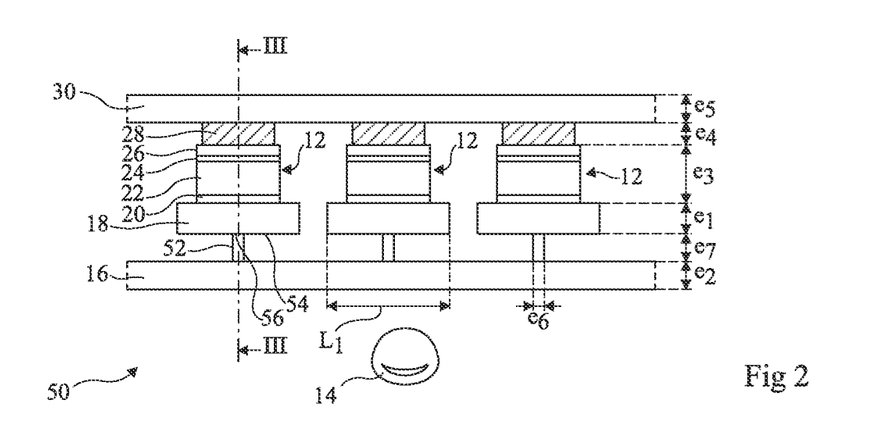
FIGS. 2 and 3 are partial simplified cross-section views of an embodiment of the user interface device according to the invention.
Figure 3:
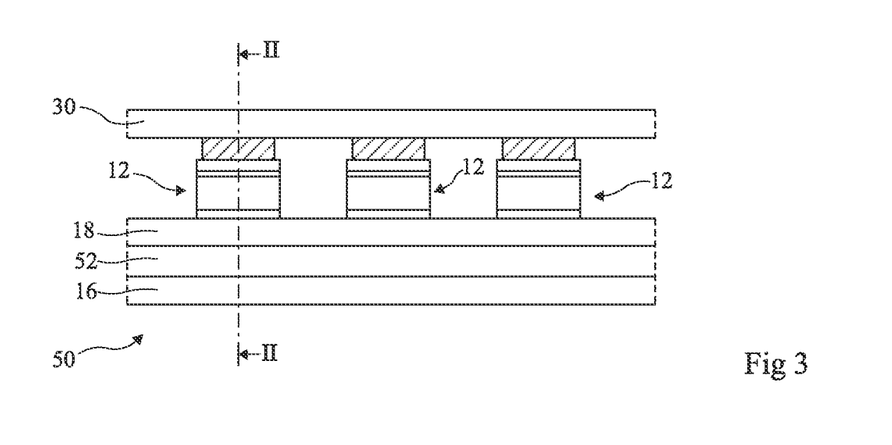

FIGS. 2 and 3 schematically and partially show an embodiment of a user interface device 50 according to the invention. FIG. 3 is a cross-section view along plane of FIG. 2 and FIG. 2 is a cross-section view along plane II-II of FIG. 3.

User interface device 50 comprises the elements of user interface device 10. However, unlike user interface device shown in FIG. 1, user interface device 50 comprises connection elements 52 interposed between transparent electrodes and substrate 16. Electrodes 18 are thus not in direct contact with substrate 16 but are spaced apart from substrate 16 by connection elements 52. The interval between substrate 16 and each electrode 18 is greater than or equal to 20 nm. The surface area of electrodes 18 opposite substrate 16 is designated with reference numeral 54. Surface 54 is preferably planar. The contact surface between each connection element 52 and the associated electrode 18 is designated with reference numeral 56. Contact surface area 56 of all connection elements is smaller than surface area 54 of electrodes 18 opposite substrate 16. Advantageously, contact surface area 56 of all connection elements 52 is smaller than 50%, preferably than 70%, of surface area 54 of electrodes 18 opposite substrate 16. Preferably, contact surface area 56 of all connection elements 52 is greater than 10% of surface area 54 of electrodes 18 opposite substrate 16. Except for connection elements 52, electrodes 18 are separated from substrate 16 by a gas or a gaseous mixture, for example, by a neutral gas, a mixture of neutral gases, or by air. Advantageously, contact surface area 56 is in the range from 10% to 50% of surface area 54 of electrodes 18 opposite substrate 16.

Connection elements 52 are made of a material more flexible than the conductive transparent material forming electrodes 18. Flexible material means a material capable of resiliently deforming and, in particular, a material having an elongation at break greater than 10%, preferably greater than 50%, more preferably greater than 100%, particularly greater than 300%.

The flexible material for example is a resist. It may be a "positive" resist. The resist portion exposed to a specific radiation then becomes soluble in a specific aqueous or organic solution, called developer solution, and the non-exposed resist portion remains non-soluble in the developer solution. It may be a "negative" resist. The resist portion exposed to the radiation becomes non-soluble in the developer solution and the non-exposed resist portion remains soluble in the developer solution. The flexible material may correspond to a mixture of a resist and of an elastomer. An elastomer is a polymer having a high elongation at break.

Examples of resist comprise the following compounds:
phenolformaldehyde, for example, a mixture of diazonaphtoquinone (or DNQ) and of a novolac resin (phenol-formaldehyde resin);
polyhydroxystyrene;
poly(methyl methacrylate) or PMMA;
poly(methyl glutarimide) or PMGI; and
epoxy-based polymer (for example, the resist sold under trade name SU-8 by Micochem).

In the present embodiment, electrodes 18 are rectilinear strips. The rectilinear strips are connected at one end to a processing circuit, not shown. A connection element 52 is associated with each electrode 18 and corresponds to a rectilinear strip extending between electrode 18 and substrate 16. As a variation, a plurality of connection elements may be arranged between each electrode 18 and substrate 16.

Electrodes 18 are made of TCO material. Examples of transparent conductive oxides are:
indium tin oxide or ITO;
tin oxide;
fluorine doped tin oxide or FTO;
zinc oxide;
aluminum doped zinc oxide or AZO; and
indium-doped cadmium oxide.

The dimensions of user interface device 50 are, as an example, the following:
thickness $e_2$ of substrate 16: from 20 µm to 125 µm;
thickness $e_1$ of each electrode 18: from 50 nm to 500 nm, preferably from 50 nm to 200 nm, more preferably in the order of 125 nm;
thickness $e_3$ of photodetector element 12, that is, thickness of the stack formed by layers 20, 22, 24, and 26: 500 nm;
thickness $e_4$ of each electrode 28: from 100 nm to 500 nm; and
thickness $e_5$ of coating 30: from 20 to 200 µm.

Each connection element 52 has a thickness $e_6$, measured along a direction perpendicular to the cross-section plane of FIG. 3, in the range from 1 to 100 and a thickness $e_7$, measured along the stacking direction of photodetector 12, in the range from 20 nm to 5 µm.

When each electrode 18 corresponds to a rectilinear strip, length $L_1$ of each electrode 18 is for example in the range from 10 to 1 mm.

According to an embodiment, device 50 is capable of detecting variations of the cast shadow of an actuating member 14 on sensor array 12, when the actuating member is arranged between a light source and the array, and of deducing therefrom information representative of a variation of the position of the actuating member. Actuating member 14 may be the user's finger, hand, or any other object. The light source is preferably ambient light, for example, the sun or the interior electric lighting of a room in a building.

When actuating member 14 is placed between the light source and the sensor array, the cast shadow of the actuating member on the sensor array causes a decrease in the light intensity received by some of sensors 12. This enables device 50 to detect the presence of actuating member 14 close to the array.

According to another embodiment, user interface device 50 is capable of using the image of actuating member 14, seen by photon sensors 12, to obtain information relative to the position of the actuating member. It should be noted that in practice, the cast shadow and the image of actuating member 14 do not coincide, except if the light source is placed exactly in the axis of projection of the actuating member on the sensor array. As a variation, user interface device 50 may detect both the cast shadow and the image of actuating member 14 to obtain a more accurate information relative to the position or to the position variations of the actuating member.

It should be noted that "position of actuating member 14" here means a relative position relative to user interface device 50. An embodiment where the user interface device 50 is displaced may be provided, actuating member 14 remaining fixed.

Although this has not been shown in the drawings, device 50 may comprise means for processing the signals delivered by photodetectors 12 (for example, a microprocessor), and means of communication with a device or a system to be controlled (wire or wireless link).

Further, and although this has not been shown, each photodetector 12 may comprise a focusing lens, for example, a Fresnel lens. A lens network also forms an interface between the photosensitive region of photodetector array 12 and substrate 16, or is integrated to substrate 16. The use of lenses enables to improve the lateral resolution of detection of the actuating member, particularly when it is remote from user interface device 50.

When a deformation is applied to user interface device 50, substrate 16 deforms. Flexible connection elements 52 behave as dampers and decrease the transmission of deformations to transparent electrodes 18. The appearing of stress in electrodes 28 is thus decreased. Connection elements 52 are flexible piles capable of moving to absorb the mechanical stress due to the flexion of deformable substrate 16. Further, connection elements 52 enable to decrease the mechanical stress present in pixels 12 by decreasing the contact surface area between connection elements 52 and electrodes 18.

Photodetector array 12 may be an "active" array. Each photodetector 12 can then be individually selected. For this purpose, it may be provided to have, in the photodetector array, one or a plurality of access transistors associated with each photodetector. The transistors may also be formed from organic semiconductor materials in liquid or gel form, by printing techniques. The transistors may be provided on the side of coating 30. Photodetector array 12 may be a "passive" array. Transparent electrodes 18 may then correspond to parallel rectilinear strips extending along the array rows and metal electrodes 28 may correspond to rectilinear strips extending along the array columns.

Figure 4:
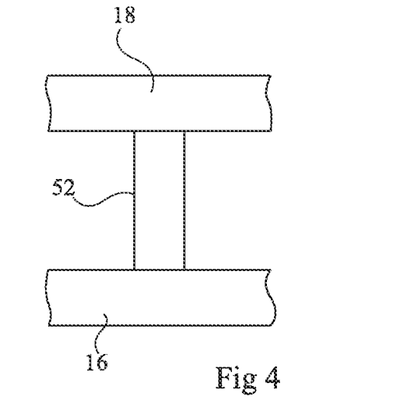
FIGS. 4 to 7 are partial simplified views of embodiments of a connection element of the interface device of FIG. 2.
Figure 5:
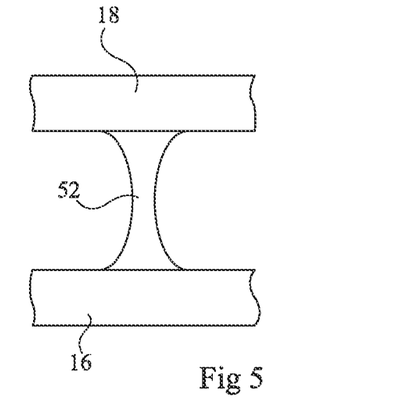
Figure 6:
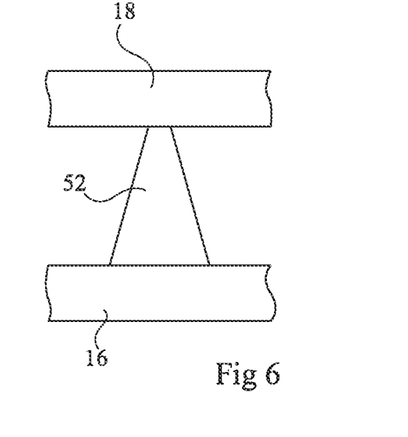
Figure 7:
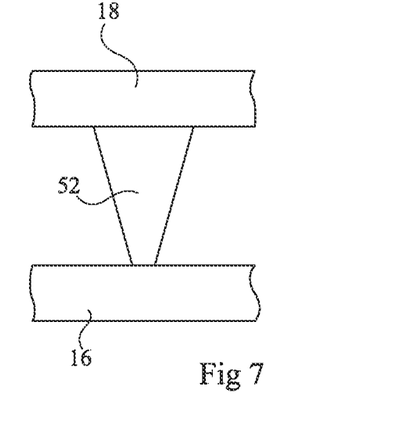

FIGS. 4 to 7 are cross-section views illustrating several profiles for connection element 52. In FIG. 4, connection element 52 has a rectangular profile. In FIG. 5, connection element 52 has a biconcave profile. In FIG. 6, connection element 52 has a trapezoidal profile having its smaller base attached to electrode 18 and having its larger base attached to substrate 16. In FIG. 7, connection element 52 has a trapezoidal profile having its smaller base attached to substrate 16 and having its larger base attached to electrode 18. Each profile may be advantageous according to the layers and manufacturing techniques used. The profile of FIG. 4 is technologically easier to form and provides a good stress resistance. A main advantage of the profile of FIG. 5 is to have a larger surface area of contact with substrate 16 and electrode 18 while keeping a small central section. This enables to both have a good bonding to substrate 16 and electrode 18 and to keep advantageous mechanical properties via the small central section. FIGS. 6 and 7 also use this advantage by preferably promoting the bonding to substrate 16 (FIG. 6) or to electrode 18 (FIG. 7).

Figure 8:
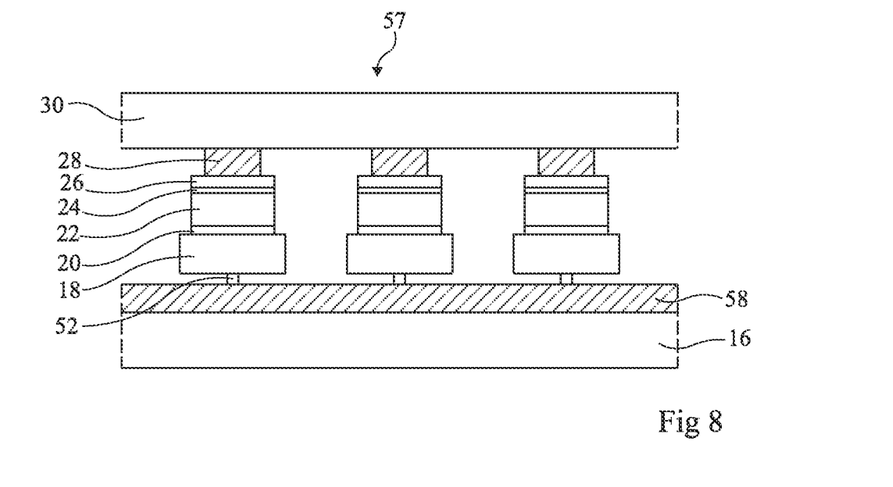
FIG. 8 is a partial simplified cross-section view of another embodiment of the user interface device.

FIG. 8 is a view similar to FIG. 2 of another embodiment of user interface device 57. In this embodiment, device 57 further comprises conductive elements 58 arranged on substrate 16. Connection elements 52 connect conductive elements 58 to electrodes 18. Conductive elements 58 may correspond to rectilinear strips. Conductive elements 58 may be metal elements, for example, made of silver. The thickness of conductive elements 58 is in the range from 10 nm to 500 nm. It is possible for conductive elements 58 not to be transparent.

Connection elements 52 have the previously-described properties and are further conductive. They may be made of insulating resist with an added conductive elastomer (for example, a silicon elastomer filled with conductive particles). The proportion of conductive elastomer varies from 1% to 10% by mass with respect to the mass of connection element 52.

The elongation at break of the conductive elastomer is in the range from 100% to 300%. It may be silicone filled with conductive particles. Preferably, silicone is stable from −50° C. to +125° C. The metal particles may be particles of copper and silver, of pure silver, of nickel and graphite, of aluminum and silver, and/or of aluminum. The elastomer may comprise from 1% to 50% by mass of metal particles with respect to the elastomer mass. The metal particles for example have an average diameter which varies from a few nanometers to several micrometers. The electric resistivity of the elastomer is for example smaller than 0.007 Ω·cm. Such an elastomer may correspond to the elastomer sold by GETELEC under trade name GT 2000.

Photodetectors 12 are thus continually electrically connected to conductive elements 58, whatever the stress state of substrate 16.

Figure 9:
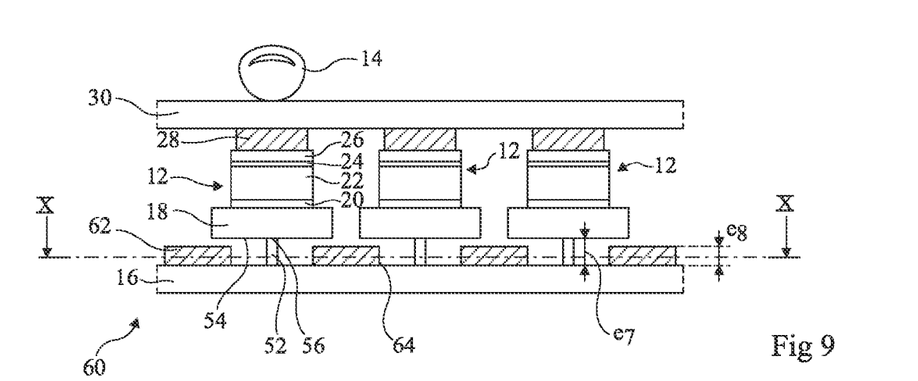
FIGS. 9 and 10 are partial simplified cross-section views of another embodiment of the user interface device.

FIG. 9 is a view similar to FIG. 2 of another embodiment of user interface device 60. In this embodiment, device further comprises conductive elements 62 arranged on substrate 16, on the side of connection elements 52 and partly extending under transparent electrodes 18. Conductive elements 62 define openings 64 to allow the passage of light radiation towards sensors 12. Conductive elements 62 may be metal elements, for example, made of silver. Thickness $e_8$ of conductive elements 62 is smaller than thickness $e_7$ of connection elements 52. Thickness $e_8$ of conductive elements 62 is in the range from 10 nm to 500 nm. It is possible for conductive elements 62 not to be transparent.

Conductive elements 62 may correspond to rectilinear strips. As an example, when transparent electrodes 18 correspond to parallel rectilinear strips, conductive elements 62 may correspond to rectilinear strips parallel to electrodes 18.

Figure 10:
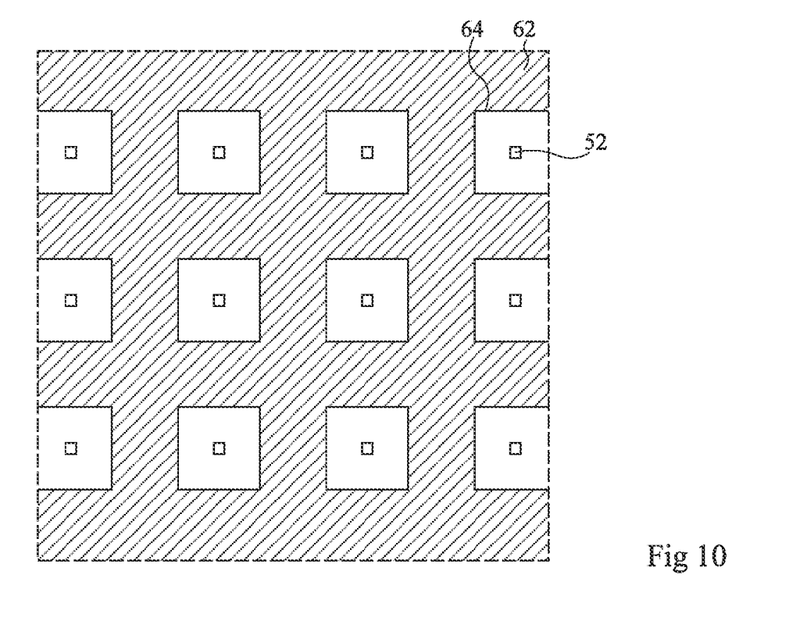

FIG. 10 shows a cross-section view of FIG. 9 along line X-X and shows an embodiment of conductive elements 62 and of connection elements 52. In this embodiment, connection elements 52 have the shape of pads, for example, having a square or rectangular cross-section, and conductive elements 62 are connected to one another and define openings 64 around each connection element 52. Openings 64 may have a square, rectangular, circular, elliptic, etc. cross-section. Each opening 64 is substantially in line with a photodetector stack 12 to allow the passage of light rays.

Figure 11:
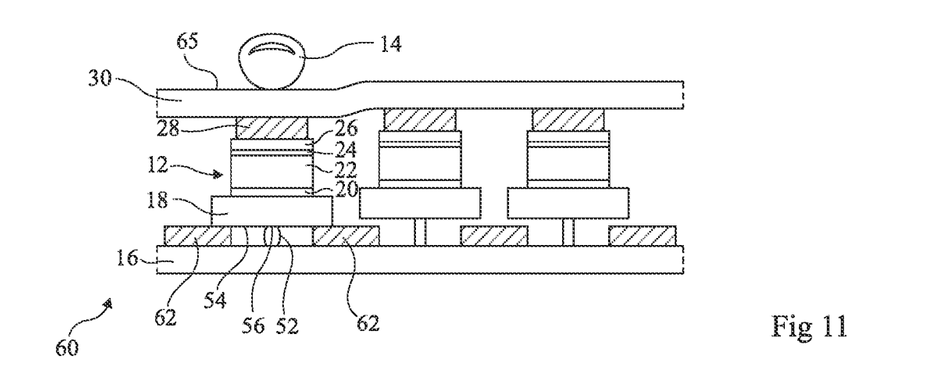
FIG. 11 is a cross-section view similar to FIG. 9 and shows the user interface device in a deformed state.

FIG. 11 shows device 60 when a pressure is exerted on coating 30, for example, by actuating member 14. In the present embodiment, conductive elements 62 are connected to a processing circuit, not shown. When user interface device 60 is not deformed, transparent electrodes 60 are not in contact with conductive elements 62. User interface device 60 does not operate. When a pressure is exerted on device 60, an area 65 of deformation of coating 30 appears under the action of actuating member 14. This causes a deformation of connection elements 52 connected to photodetectors 12 in deformation area 65. Photodetectors 12 displace all the way to come into contact with the adjacent conductive elements 62. Only the signals stored in photodetectors 12 thus connected to conductive elements 62 may be measured by the processing circuit. Device 60 may be used simultaneously as a contactless detection display and as a touch-sensitive display. As a variation, the deformation may be applied on the side of substrate 16. In FIG. 11, a photodetector 12 has been shown in deformation area 65 in contact with the two adjacent conductive elements 62 interposed between electrode 18 and substrate 16. As a variation, according to the location of deformation area 65, the deformation of connection elements 52 may result in an inclination of photodetectors 12 until they come into contact with a single one of conductive elements 62 of the pair of conductive elements 62 interposed between electrode 18 and substrate 16.

An example of application for example is to ascertain that contactless user interface device 60 only operates when it is properly deformed. As an example, user interface device 60 is initially in a planar configuration where photodetectors 12 are not connected to conductive elements 62. Contactless user interface device 60 then does not operate. According to the targeted application, the user interface device is applied to the surface of a support which is not planar. This results in a deformation of user interface device 60 and in putting into contact transparent electrodes 18 with conductive elements 62. User interface device 60 can then be used as a contactless display. The user interface device is then idle when the substrate is not submitted to a mechanical deformation and is functional when the substrate is submitted to a mechanical deformation.

FIGS. 12A to 12G illustrate the structures obtained at successive steps of an embodiment of a method of manufacturing user interface device 60 shown in FIG. 9.

Figure 12A:
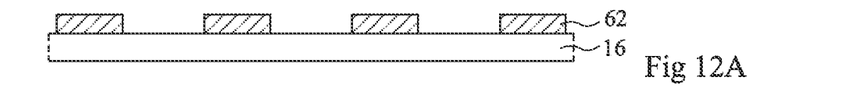
FIGS. 12A to 12G are partial simplified cross-section views of the structures obtained a successive steps of an embodiment of a method of manufacturing the user interface device shown in FIG. 9.

FIG. 12A shows the structure obtained after a step of forming conductive elements 62 on substrate 16. As an example, conductive elements 62 are formed on substrate 16 by a vapor deposition method.

Figure 12B:
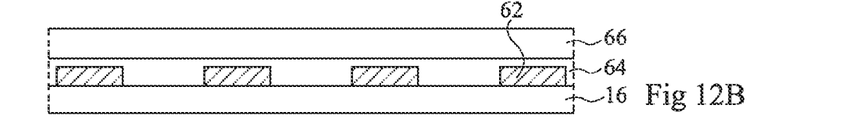

FIG. 12B shows the structure obtained after having covered the structure of FIG. 12A with a resist layer 64, to totally cover conductive elements 62, and then after having deposited, on resist layer 64, a layer 66 of TCO material, for example, ITO. In the present embodiment, the resist is a negative resist. Resist layer 64 may be deposited by a spin coating method. TCO material layer 66 may be deposited by cathode sputtering.

Figure 12C:
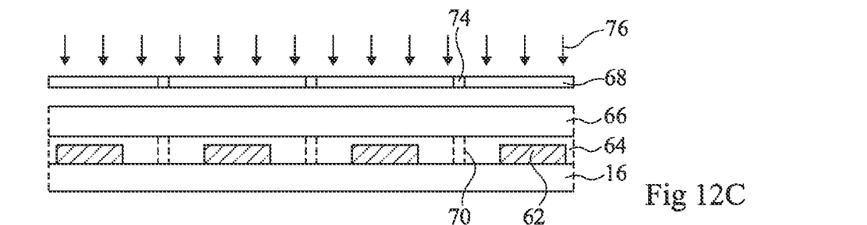

FIG. 12C shows the structure obtained after a step of exposing resin layer 64 to a radiation through a mask 68, or illumination step, to form patterns 70 in resin layer 64. Patterns 70 are shown by dotted lines in the different drawings. Mask 68 comprises openings 74 reproducing a pattern to be transferred to resin layer 64. The radiation used to expose resist layer 64 is shown by arrows 76.

As a variation, the step of depositing TCO material layer 66 may be carried out after the step of exposing resin layer 64.

Figure 12D:
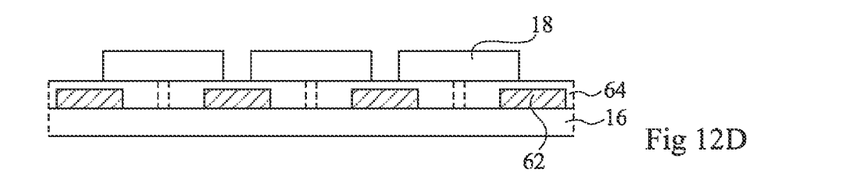

FIG. 12D shows the structure obtained after a step of etching ITO layer 66 to define transparent electrodes 18. The etching of ITO layer 66 may be a laser etching.

Figure 12E:
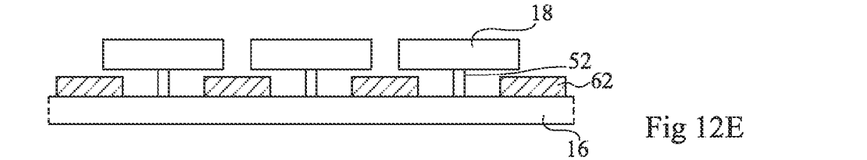

FIG. 12E shows the structure obtained after the partial removal of resin layer 64 to define connection elements 52. The removal of resin layer 64 may be performed by dissolving the non-illuminated resist portions in an adapted aqueous or organic solution.

Figure 12F:
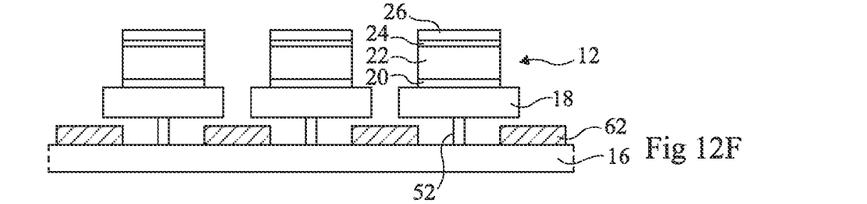

FIG. 12F shows the structure obtained after the forming of photodetectors 12. The stacks forming photodetectors 12 may be formed by printing methods. The materials of abovementioned portions 20 to 26 are deposited in liquid form, for example, in the form of conductive and semiconductor inks by means of inkjet printers. It should here be noted that materials in liquid form here also include gel materials capable of being deposited by printing techniques. Anneal steps may be provided between the depositions of the different layers, but the anneal temperatures cannot exceed 150° C., and the deposition and the possible anneals may be performed at the atmospheric pressure. The forming of organic semiconductor components by printing techniques is for example described in article "CEA-LITEN S2S Printing Platform for Organic CMOS and Sensors Devices" by Jean-Yves Laurent et al, LOPE-C Conference, June 2011, Frankfurt.

Figure 12G:
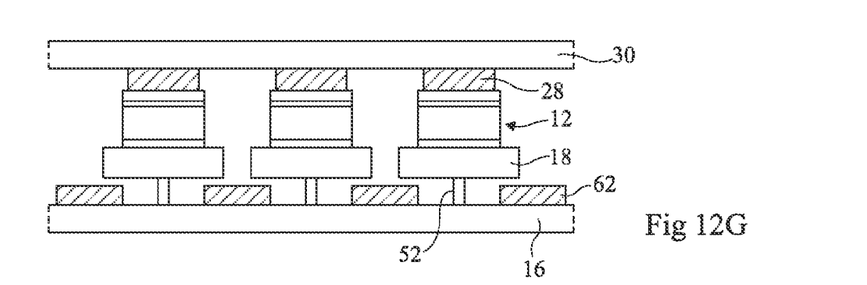

FIG. 12G shows the structure obtained after covering the structure shown in FIG. 12F with coating 30 provided with metal electrodes 28. The fastening of metal electrodes 28 to portions 26 of photodetectors 12 may be performed by lamination with, for example, the use of conductive glues.

FIGS. 13A to 13G show the structures obtained at successive steps of another embodiment of a method of manufacturing user interface device 60 shown in FIG. 9.

Figure 13A:
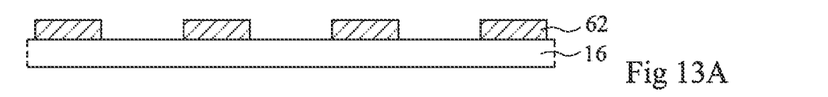
FIGS. 13A to 13G are partial simplified cross-section views of the structures obtained at successive steps of another embodiment of a method of manufacturing the user interface device shown in FIG. 9.
Figure 13B:
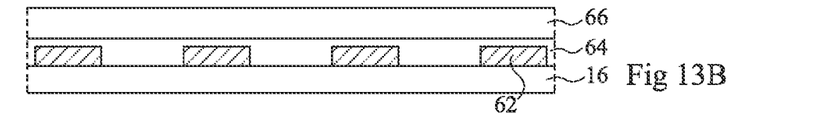
Figure 13C:
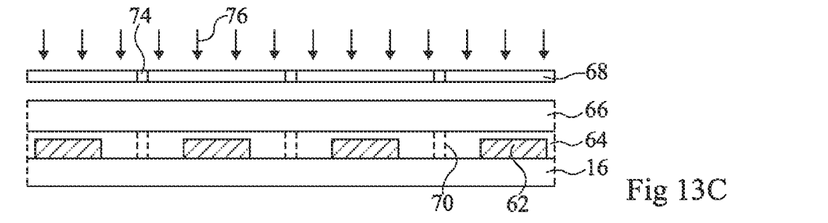

FIGS. 13A to 13C are identical respectively to FIGS. 12A to 12C described hereabove.

Figure 13D:
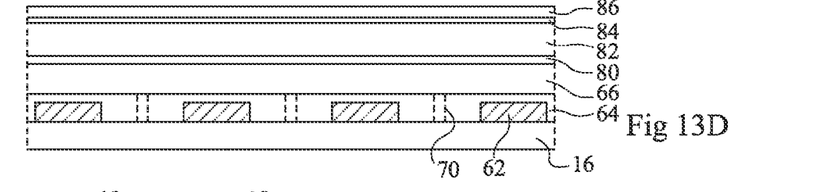

FIG. 13D shows the structure obtained after having deposited on layer 66, successively, layers 80, 82, 84, and 86. Layer 80 for example is a zinc oxide layer (electron donor layer). Layer 82 is an organic semiconductor polymer. Layer 84 is made of a heavily-doped organic semiconductor polymer (hole donor layer). Layer 86 is made of a conductive material, for example, carbon. Layers 80, 82, 84, and 86 may be deposited by silk screening, inkjet printing, or spin coating.

Figure 13E:
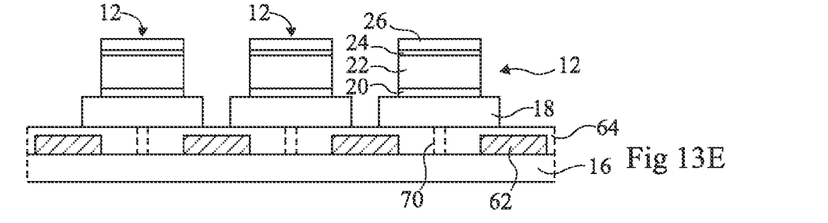

FIG. 13E shows the structure obtained after etching layers 86, 84, 82, 80, and 66 to successively define portions 26, 24, 22, and 20 of each photodetector 12 and to define transparent electrodes 18. It may be a laser etching. Preferably, each layer 86, 84, 82, 80, and 66 is successively etched. Indeed, the laser etching conditions may be specific for each layer 86, 84, 82, 80, and 66.

Figure 13F:
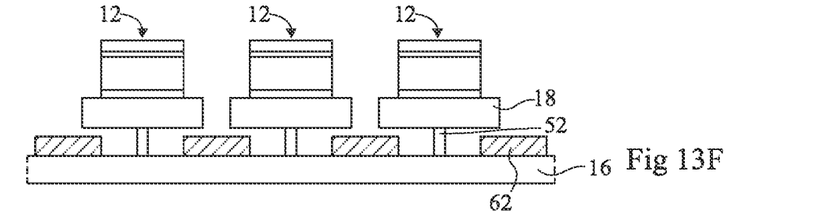

FIG. 13F shows the structure obtained after the partial removal of resin layer 64 to define connection elements 52. The removal of the resin layer may be performed by dissolving the non-illuminated resist portions in an adapted aqueous or organic solution.

Figure 13G:
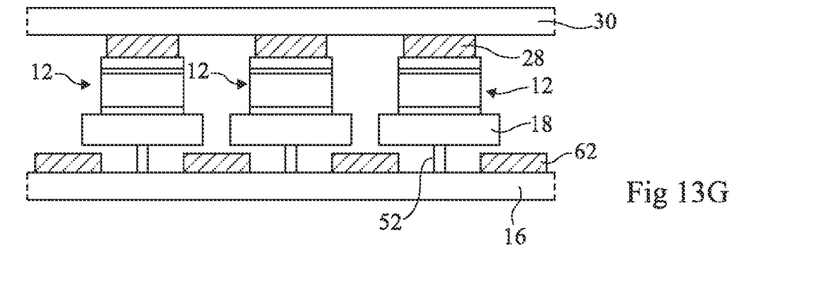

FIG. 13G is identical to previously-described FIG. 12G.

Specific embodiments of the present invention have been described. Various alterations and modifications will occur to those skilled in the art. In particular, although the present invention has been described for a user interface device having connection elements 52 located between electrodes 18 and substrate 16 or between electrodes 18 and conductive elements 58, connection elements 52 may be arranged between electrodes 28 and coating 30. Further, connection elements 52 may be provided both between electrodes 18 and substrate 16 (or conductive elements 58) and between electrodes 28 and coating 30. This last case advantageously enables to distribute the stress both on the top and on the bottom of each photodetector 12 and thus to further avoid the occurrence of excessive stress.

Further, although the present invention has been described for a user interface device comprising a photodetector array, the present invention may apply to a display screen comprising an array of photon emitter elements or of elements modifying the passing of photons, connected to transparent TCO electrodes covered with a transparent substrate.

Various embodiments with different variations have been described hereabove. It should be noted that those skilled in the art may combine various elements of these various embodiments and variations without showing any inventive step. As an example, the profiles of connection elements 52 shown in FIGS. 5 to 7 may be implemented with the embodiments of the user interface device shown in FIGS. 8 and 9.

The invention claimed is:

1. An interface device comprising a pixel array and a transparent insulating substrate, pixels of the pixel array being connected to the substrate by connection elements, the contact surface area between the connection elements and the pixels being smaller than the surface area of the pixels opposite the substrate, the pixels being separated from the substrate by a gas or gaseous mixture except for the connection elements, wherein the connection elements are made of a flexible material having an elongation at break greater than or equal to 10%.

2. The interface device of claim 1, wherein the contact surface area between the connection elements and the pixels is smaller than half the surface area of the electrodes opposite the substrate.

3. The interface device of claim 1, wherein the connection elements are made of a material more flexible than the materials forming the pixels.

4. The interface device of claim 1, wherein the pixels comprise transparent conductive electrodes, the connection elements being connected to the electrodes, the contact surface area between the connection elements and the electrodes being smaller than the surface area of the electrodes opposite the substrate.

5. The interface device of claim 4, wherein the electrodes are made of transparent conductive oxide.

6. The interface device of claim 5, wherein the transparent conductive oxide is indium tin oxide or gallium zinc oxide.

7. The interface device of claim 1, wherein the connection elements comprise at least a resist.

8. The interface device of claim 7, wherein the connection elements further comprise at least an elastomer.

9. The interface device of claim 1, wherein the connection elements are electrically conductive.

10. The interface device of claim 1, wherein the pixels are organic photon sensors.

11. The interface device of claim 1, further comprising conductive elements on the substrate partly extending between the electrodes and the substrate, where the electrodes are not in contact with the conductive elements when the device is not deformed.

12. The interface device of claim 11, wherein the conductive elements are metallic or made of conductive polymer.

13. A method of manufacturing an interface device comprising a pixel array and a transparent insulating substrate, pixels of the pixel array being connected to the substrate by connection elements, the contact surface area between the connection elements and the pixels being smaller than the surface area of the pixels opposite the substrate, the method comprising steps of:
    (a) covering the transparent insulating substrate with a resist layer;
    (b) exposing the resist layer to a radiation to define the connection elements;
    (c) forming the pixels on the resist layer; and
    (d) before or after step (c), partially removing the resist layer to form the connection elements.

14. The method of claim 13, wherein step (c) comprises covering the resist layer with an electrically-conductive transparent layer and etching the electrically-conductive transparent layer to form the electrodes.

15. The method of claim 14, wherein the electrically-conductive transparent layer is made of transparent conductive oxide.

16. The method of claim 14, wherein the pixels are formed by successive deposition of additional layers on the electrically-conductive transparent layer and etching said additional layers.

17. The method of claim 14, wherein the pixels are formed by printing techniques on electrodes.

18. The method of claim 13, further comprising forming conductive elements on the substrate and covering the substrate and the conductive elements with the resist layer.

* * * * *